(12) United States Patent
Franz et al.

(10) Patent No.: US 7,554,228 B2
(45) Date of Patent: Jun. 30, 2009

(54) COOLING FAN WITH AN OUTER ROTOR MOTOR

(75) Inventors: John P. Franz, Houston, TX (US); Wade D. Vinson, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 477 days.

(21) Appl. No.: 11/137,073

(22) Filed: May 25, 2005

(65) Prior Publication Data

US 2006/0267422 A1    Nov. 30, 2006

(51) Int. Cl.
*H02K 9/00* (2006.01)
(52) U.S. Cl. .................... 310/67 R; 310/89; 310/63; 417/354
(58) Field of Classification Search ............ 310/62, 310/63, 67 R, 89; 417/354, 366, 423.12, 417/423.15, 423.7
See application file for complete search history.

(56) References Cited

U.S. PATENT DOCUMENTS

| 3,032,666 | A | * | 5/1962 | Papst | 310/67 R |
| 4,883,982 | A | * | 11/1989 | Forbes et al. | 310/62 |
| 4,950,932 | A | * | 8/1990 | Harms et al. | 310/67 R |
| 5,217,353 | A | * | 6/1993 | De Filippis | 417/368 |
| 5,955,807 | A | * | 9/1999 | Kajiura et al. | 310/156.66 |
| 5,969,445 | A | * | 10/1999 | Horiuchi et al. | 310/64 |
| 6,107,708 | A | * | 8/2000 | Yamaguchi et al. | 310/58 |
| 6,196,802 | B1 | * | 3/2001 | Matsumoto | 416/229 R |
| 6,661,147 | B2 | * | 12/2003 | Tajima et al. | 310/216 |
| 7,211,915 | B2 | * | 5/2007 | Conrady et al. | 310/90 |

* cited by examiner

*Primary Examiner*—Dang D Le

(57) ABSTRACT

A cooling fan with an outer rotor motor supported by a fan housing. A motor housing is disposed within a conduit through the fan housing, while the outer rotor motor is disposed within the motor housing. A plurality of support members coupled between the motor housing and the fan housing enable the fan housing to support the motor housing. A hub is rotatably coupled to the outer rotor motor and has a first portion disposed within the motor housing and a second portion disposed outside of the motor housing. A plurality of blades extends radially from the second portion said hub.

21 Claims, 4 Drawing Sheets

COOLING FAN WITH AN OUTER ROTOR MOTOR

BACKGROUND

Computer systems include numerous electrical components that draw electrical current to perform their intended functions. For example, a computer's microprocessor or central processing unit ("CPU") requires electrical current to perform many functions such as controlling the overall operations of the computer system and performing various numerical calculations. Generally, any electrical device through which electrical current flows produces heat. The amount of heat any one device generates generally is a function of the amount of current flowing through the device.

Typically, an electrical device is designed to operate correctly within a predetermined temperature range. If the temperature exceeds the predetermined range (i.e., the device becomes too hot or too cold), the device may not function correctly, thereby potentially degrading the overall performance of the computer system. Thus, many computer systems include cooling systems to regulate the temperature of their electrical components. One type of cooling system is a forced air system that relies on one or more cooling fans to blow air over the electronic components in order to cool the components.

The cubic feet per minute ("CFM") of air that can be moved across an electric device is an important factor in how much heat can be removed from the device. Thus, the capacity of a cooling fan is a critical factor in selecting an air mover for use in a cooling application. The CFM that a cooling fan can produce is governed a number of factors including: the total area of the blades generating the airflow, the free area provided for airflow through the fan, the design of the blades, and the power generated by the electric motor.

The electric motors used to power many cooling fans are outer rotor motors that utilize a windings section with magnets disposed outside the windings. As electrical current flows through the windings, the magnets rotate about the axis of the motor. The amount of current flowing through the windings determines the power that the motor produces. One way to generate more power is to increase the size of the windings section, but this increase in size is not without drawbacks. For example, as the diameter of the windings section increases, either the diameter of the fan increases or the free area through the fan decreases. Similarly, as the length of the windings section increases, the length of the fan increases and the windings section may become difficult to properly support in a horizontal orientation. Another drawback to increasing the size of a motor is that the cost of the component parts increases as their size increases.

BRIEF SUMMARY

The problems noted above are solved in large part by a cooling fan comprising a fan housing and an outer rotor motor that is supported by a motor housing that is supported within a conduit through the fan housing. A hub is rotatably coupled to the outer rotor motor and has a first portion disposed within the motor housing and a second portion disposed outside of the motor housing. A plurality of blades extend radially from the second portion said hub.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As the length of a windings section of an electric motor increases the amount of power that the motor can generate also increases. In order to take advantage of the full length of the windings section, the magnet assembly needs to be the same length. Since, in outer rotor motors, the magnet assembly is mounted within the blade assembly hub, the hub should extend the full length of the windings section. Because the hub essentially covers the outer surface of the housing, the windings section of an outer rotor motor is generally only connected to the fan housing at its base.

Because the windings section is only connected at its base, when the cooling fan is used in a horizontal orientation, the windings section is essentially cantilevered from the housing. As the length of the windings section increases the bending moment at the base of the windings section increase to the point where the housing may allow undesirable deflection in the windings section. This deflection may lead to imbalances and vibration in the moving parts of the fan. Therefore, in order to properly support a windings section having a relatively high length-to-width ratio, additional support may be needed.

Figure 1:
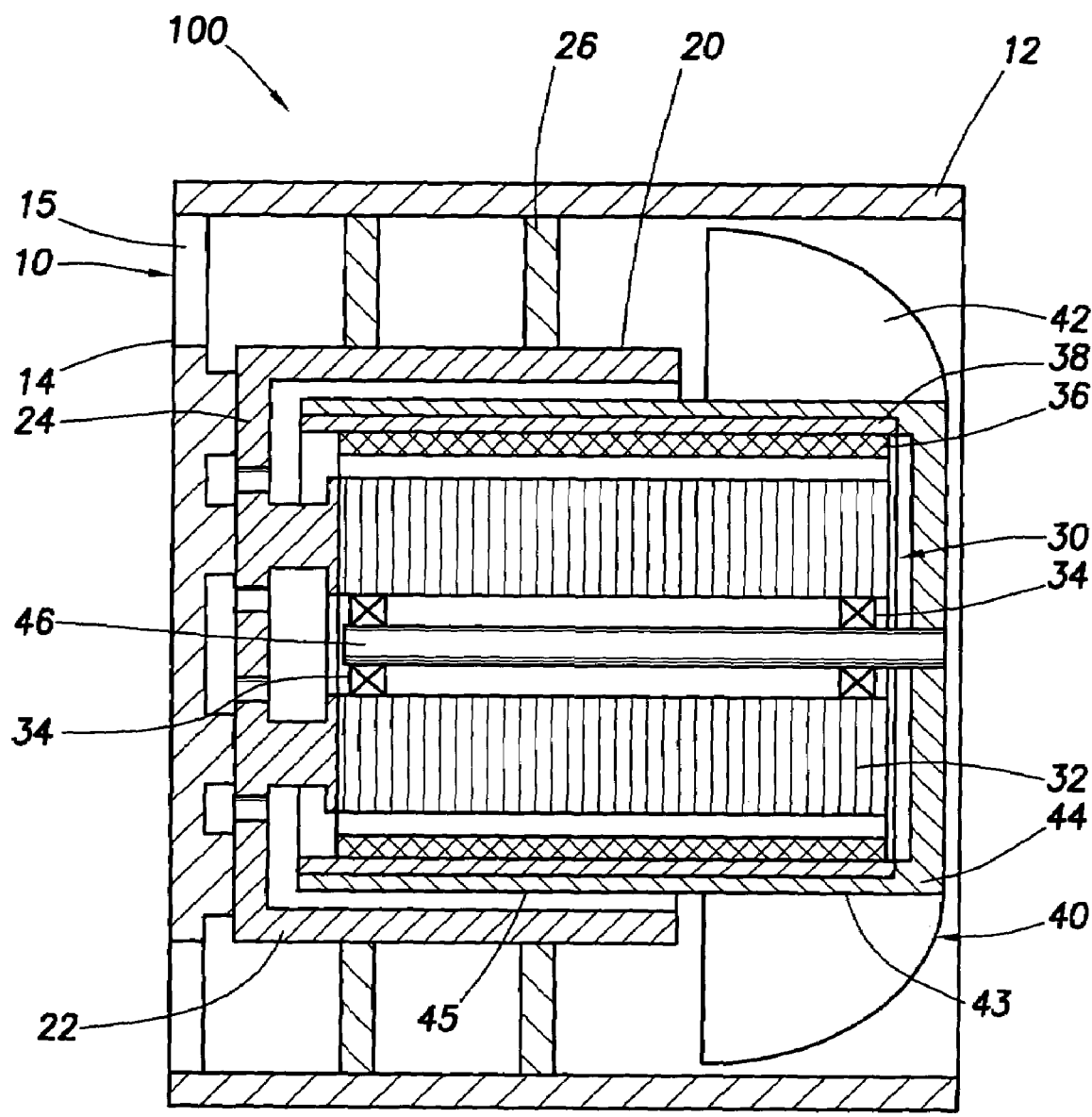
FIG. 1 shows a cross-sectional view of a cooling fan constructed in accordance with embodiments of the invention.

One solution for supporting the windings section is shown in FIG. 1, where cooling fan 100 comprises fan housing 10, motor housing 20, outer rotor motor 30, and blade assembly 40. Fan housing 10 comprises cylindrical inner conduit 12 and base 14. The outer surface of fan housing 10 may be rectangular, cylindrical, or any other desired shape. Motor housing 20 comprises cylindrical outer wall 22, base 24, and support members 26. Outer rotor motor 30 comprises windings section 32, bearings 34, magnet assembly 36, and back iron cup 38. Blade assembly 40 comprises radial blades 42, hub 44, and axle 46.

Outer wall 22 of motor housing 20 is coupled to fan housing 10 via support members 26. Support members 26 may be struts, spokes, or any other structural member that connects motor housing 20 to fan housing 10 while allowing airflow through conduit 12. Windings section 32 is fixably coupled to base 24 of motor housing 20. Windings section 32 is disposed within motor housing 20 such that a portion of the windings section projects out of motor housing 20 on the end opposite base 24. Hub 44 is disposed over windings section 32 such that an outer hub portion 43 is outside of motor housing 20 and inner hub portion 45 is disposed within motor housing 20. Radial blades 42 extend from outer hub portion 43.

Back iron cup 38 and magnet assembly 36 are coupled to the inside surfaces of hub 44. Axle 46 is rotatably support by bearings 34. As current flows through windings section 32 it forms a magnetic field that interacts with magnet assembly 36 to cause blade assembly 40 to rotate on axle 46 such that blades 42 generate air flow through conduit 12 past support members 26 and through openings 15 in base 14.

The weight of windings section 32 is transferred into motor housing 20 through base 24. Outer wall 22 of motor housing 20 is supported by support members 26, which carry the load into fan housing 10. In certain embodiments, base 24 of motor housing 20 may also be coupled to base 14 of fan housing 10 to further stabilize windings section 32. Providing stable support of windings section 32 reduces the deflection and vibration in the motor at high speeds. Therefore, the outer diameter of blades 42 can be increased so as to decrease the gap formed between the blades and conduit 12. Minimizing this gap reduces acoustic emissions and improves flow capacity. Various fan blade configurations can be used with other embodiments of fan 100.

Support members 26 may be a basic structural member, such as a strut, or may be stator blades or other feature that enhances aerodynamic performance of fan 100. Although motor housing 20 and support members 26 may decrease the annular area available for flow, the increased power available from a larger windings section can offset the limitations of the decreased annular area.

Figure 2:
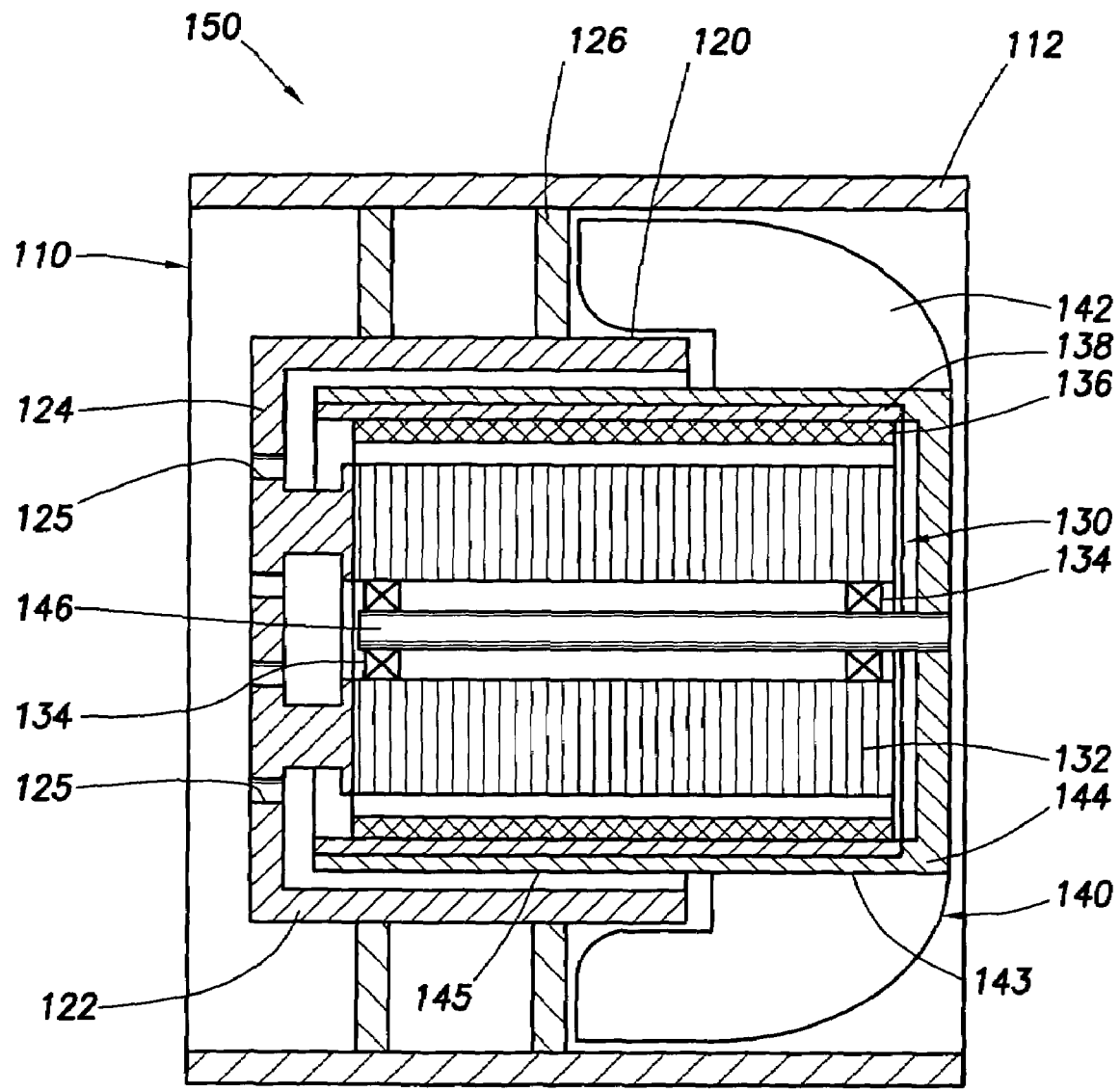
FIG. 2 shows a cross-sectional view of a cooling fan constructed in accordance with embodiments of the invention.

Referring now to FIG. 2, cooling fan 150 comprises fan housing 110, motor housing 120, outer rotor motor 130, and blade assembly 140. Fan housing 110 comprises conduit 112 and supports motor housing 120 via support members 126. Support members 126 are arranged such that the base of fan housing 110 can be open and free of any structural members. Motor housing 120 comprises outer wall 122 and base 124, which includes openings 125 that provide ventilation for motor 110. Motor 130 comprises windings section 132, bearings 134, magnet assembly 136, and back iron cup 138. Blade assembly 140 comprises radial blades 142, hub 144, and axle 146. Blades 142 extend past the leading edge of motor housing 120 into conduit 112. Other embodiments may include various fan blade configurations, including fan blades that do not extend past the leading edge of the motor housing.

Figure 3:
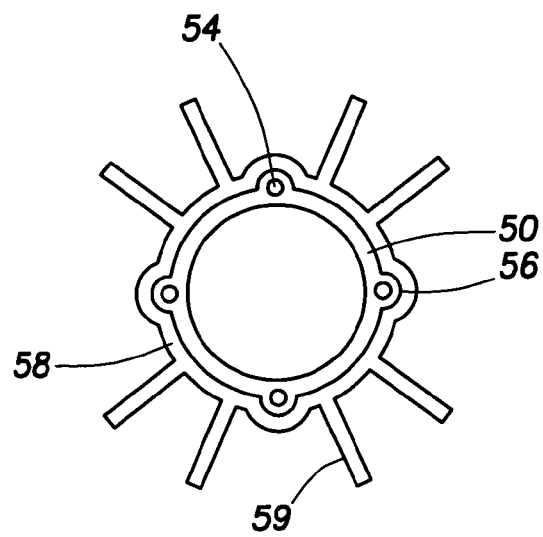
FIG. 3 shows an end view of a back iron cup constructed in accordance with embodiments of the invention.
Figure 4:
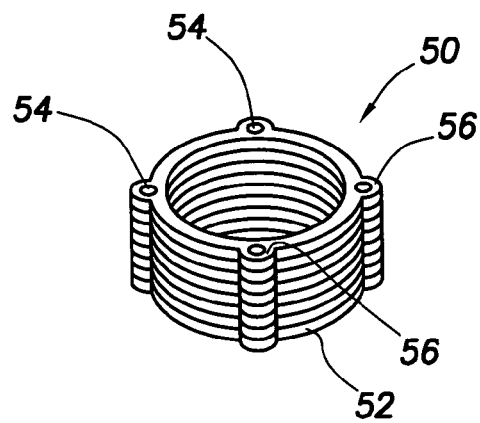
FIG. 4 shows an isometric view of the back iron cup of FIG. 3.

Referring now to FIGS. 3 and 4, a back iron cup 50 comprises a plurality of laminated rings 52 held together by stakes 54 through staking tabs 56. Hub 58, including radial blades 59, may be directly overmolded onto back iron cup 50. Providing a back iron cup 50 constructed from laminated rings reduces eddy current losses found when solid back iron cups are used. Stakes 54 and staking tabs 56 enable high volume manufacturing techniques to be used. Hub 58 can be overmolded onto back iron cup 50 so as to minimize reduction in blade area.

Figure 5:
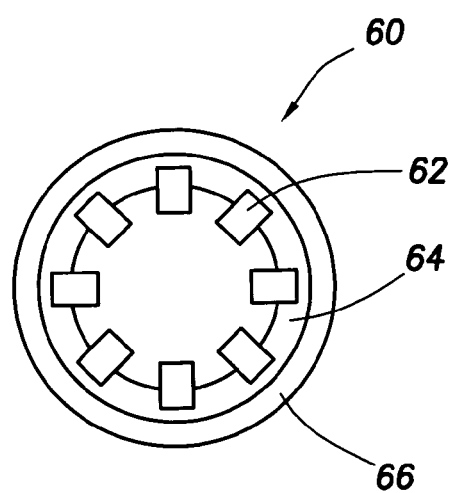
FIG. 5 shows an end view of a magnet assembly constructed in accordance with embodiments of the invention.
Figure 6:
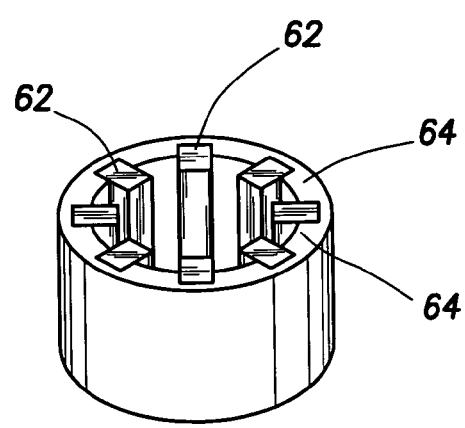
FIG. 6 shows an isometric view of the magnet assembly of FIG. 5.

Referring now to FIGS. 5 and 6, magnet assembly 60 comprises individual piece magnets 62 and magnet holder 64. Magnet holder 64 may be constructed from plastic or some other non-magnetic material. Piece magnets 62 provide advantages over solid ring magnets because their independent poles reduce losses inherent to the transitioning poles of a ring magnet. Individual piece magnets 62 also reduce the volume of magnetic material that is used, allowing more expensive materials to be utilized. Magnet holder 64 eases placement of piece magnets 62. In certain embodiments magnet holder 64 acts as a holder to locate and retain magnets 62. In other embodiments, piece magnets 62 may be placed in a fixture and magnet holder 64 overmolded directly onto magnets 62. Magnet assembly 60 can then be glued, or otherwise coupled, to back iron cup 66.

Figure 7:
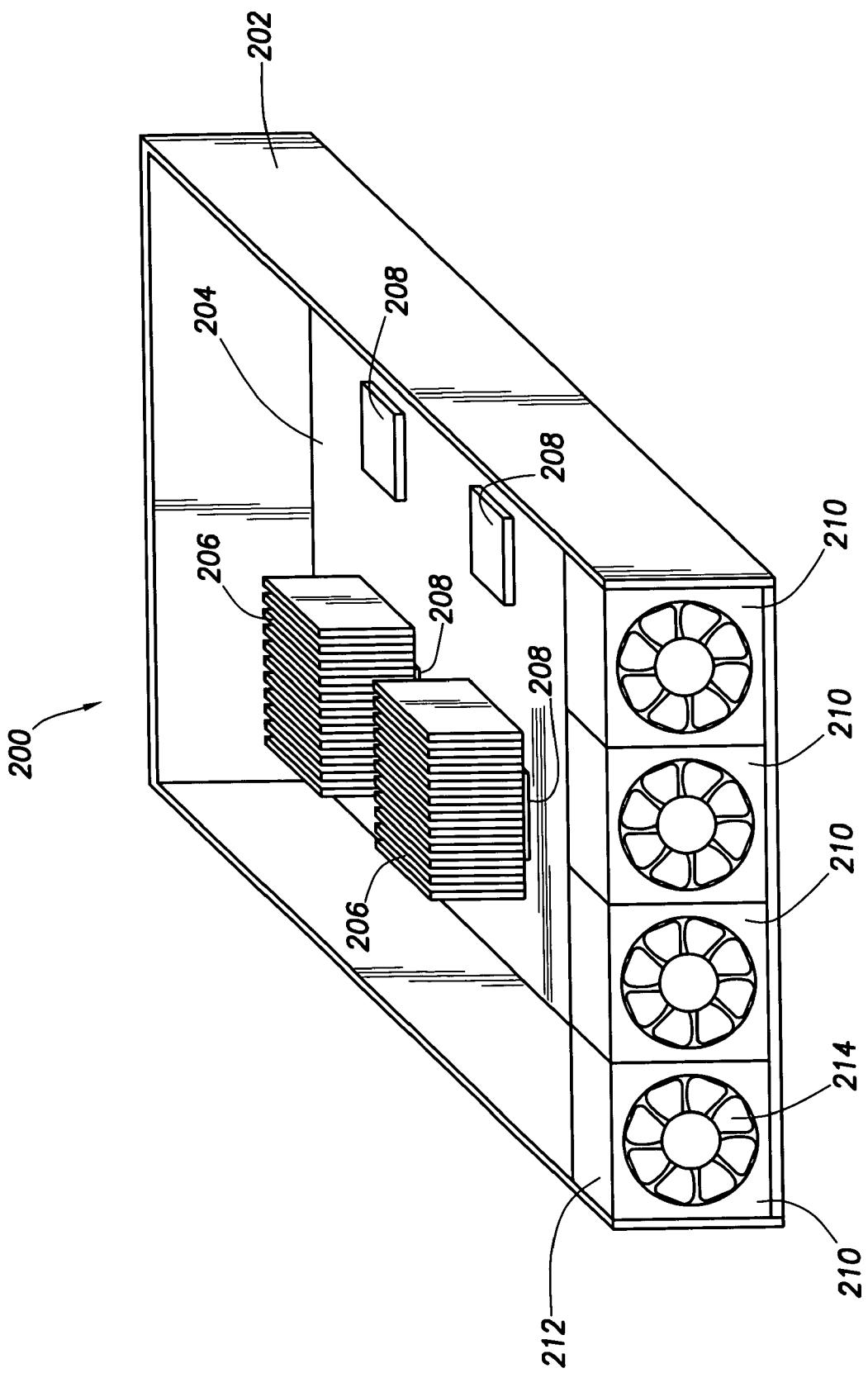
FIG. 7 shows a computer system including cooling fans constructed in accordance with embodiments of the invention.

Referring now to FIG. 7, a computer assembly 200 comprises chassis 202, motherboard 204, heat sinks 206, electronic components 208, and cooling fans 210. Each cooling fan 210 comprises a blade assembly 212 that has a hub that extends between the windings section of an outer rotor motor and a motor housing that supports the windings section within housing 214. Cooling fans 210 are arranged so as to generate an airflow that cools electronic component 208. Heat sinks 206 may be arranged so as to be directly in the airflow generated by fans 210. Heat sinks 206 are coupled to electronic components so that the heat generated by the electronic component is dissipated to the airflow through the increased surface area of the heat sink.

The above discussion is meant to be illustrative of the principles and various embodiments of the present invention. Numerous variations and modifications will become apparent to those skilled in the art once the above disclosure is fully appreciated. For example, the back iron cup and magnet assemblies described herein could also be applied to other systems that utilize outer rotor motors. It is intended that the following claims be interpreted to embrace all such variations and modifications.

What is claimed is:

1. A cooling fan comprising:
    a fan housing having a conduit therethrough;
    a motor housing disposed within the conduit of said fan housing, said motor housing comprising a base and an outer wall extending substantially normally therefrom in the axial direction;
    a plurality of support members extending substantially radially between the outer wall of said motor housing and said fan housing, the plurality of support members comprising:
        a first support member displaced axially from the base of said motor housing; and
        a second support member disposed between the first support member and the base of said motor housing;
    an outer rotor motor supported by said motor housing;
    a hub rotatably coupled to said outer rotor motor, wherein said hub has a first portion disposed within said motor housing and a second portion disposed outside of said motor housing; and
    a plurality of blades extending radially from the second portion of said hub.

2. The cooling fan of claim 1 wherein said plurality of support members are coupled between the outer wall of said motor housing and said fan housing.

3. The cooling fan of claim 2, wherein said plurality of support members are connected to an inner surface of said fan housing and an outer surface of the outer wall of said motor housing.

4. The cooling fan of claim 3, wherein said plurality of support members are substantially normal to the inner surface of said fan housing and the outer surface of the outer wall of said motor housing.

5. The cooling fan of claim 1 wherein said outer rotor motor further comprises:
a windings section coupled to the base of said motor housing; and
a magnet coupled to an inner surface of said hub.

6. The cooling fan of claim 5 wherein the windings section is disposed within the first and second portions of said hub and the magnet is coupled to the first and second portions of said hub.

7. The cooling fan of claim 5 wherein the second portion of said hub is disposed between the windings section and the outer wall of said motor housing.

8. The cooling fan of claim 5 wherein said outer rotor motor further comprises a back iron cup disposed between the magnet and the inner surface of said hub.

9. The cooling fan of claim 8 wherein the back iron cup comprises a plurality of laminated rings.

10. The cooling fan of claim 9 wherein the back iron cup further comprises plurality of stakes disposed through the laminated rings.

11. The cooling fan of claim 10 wherein the plurality of stakes are disposed through a plurality of staking tabs on the laminated rings.

12. The cooling fan of claim of claim 9 wherein said plurality of blades are overmolded onto the back iron cup.

13. The cooling fan of claim 5 wherein said magnet comprises a plurality of piece magnets disposed within a magnet holder.

14. The cooling fan of claim 13 wherein the plurality of piece magnets are inserted into the magnet holder.

15. The cooling fan of claim 13 wherein the magnet holder is overmolded onto the plurality of piece magnets.

16. A computer system comprising:
a chassis;
an electronic component disposed within said chassis; and
a cooling fan disposed within said chassis, wherein said cooling fan comprises:
a fan housing coupled to said chassis;
an outer rotor motor supported in said fan housing by a motor housing comprising a base and an outer wall extending substantially normally therefrom in the axial direction;
a plurality of support members extending radially between the outer wall of said motor housing and said fan housing, the plurality of support members comprising:
a first support member displaced axially from the base of said motor housing; and
a second support member disposed between the first support member and the base of said motor housing; and
a blade assembly rotatably coupled to said outer rotor motor, wherein said blade assembly comprises a plurality of blades radially extended from a hub, wherein a portion of the hub extends between the motor housing and said outer rotor motor.

17. The computer system of claim 16 wherein said outer rotor motor further comprises:
a windings section fixably coupled to the motor housing;
a back iron cup coupled to the hub of said blade assembly; and
a magnet coupled to said back iron cup.

18. The computer system of claim 17 wherein the back iron cup comprises a plurality of laminated rings interconnected by a plurality of stakes disposed through a plurality of staking tabs on the laminated rings.

19. The computer system of claim 18 wherein the plurality of blades are overmolded onto the back iron cup.

20. The computer system of claim 17 wherein said magnet comprises a plurality of piece magnets disposed within a magnet holder.

21. The computer system of claim 20 wherein the magnet holder is overmolded onto the plurality of piece magnets.

* * * * *

UNITED STATES PATENT AND TRADEMARK OFFICE
CERTIFICATE OF CORRECTION

PATENT NO.        : 7,554,228 B2
APPLICATION NO. : 11/137073
DATED             : June 30, 2009
INVENTOR(S)       : John P. Franz et al.

Page 1 of 1

It is certified that error appears in the above-identified patent and that said Letters Patent is hereby corrected as shown below:

In column 5, line 35, in Claim 12, after "fan of" delete "claim of".

In column 6, line 19, in Claim 16, after "housing;" delete "and".

Signed and Sealed this

Twenty-fourth Day of November, 2009

David J. Kappos
*Director of the United States Patent and Trademark Office*